United States Patent
Stollman

(10) Patent No.: US 8,296,214 B1
(45) Date of Patent: Oct. 23, 2012

(54) METHODS AND APPARATUS RELATED TO BILLING AND ACCOUNTING FOR ASSETS THAT REQUIRE MORE THAN TWO FACTORS TO ESTABLISH ASSET VALUE

(76) Inventor: Jeff Stollman, Chesterbrook, PA (US)

( * ) Notice: Subject to any disclaimer, the term of this patent is extended or adjusted under 35 U.S.C. 154(b) by 0 days.

(21) Appl. No.: 13/245,023

(22) Filed: Sep. 26, 2011

(51) Int. Cl.
*G06Q 40/00* (2012.01)
(52) U.S. Cl. ..................................... 705/36 R
(58) Field of Classification Search ............... 705/35–40
See application file for complete search history.

(56) References Cited

U.S. PATENT DOCUMENTS

| | | | |
|---|---|---|---|
| 4,642,767 A | 2/1987 | Lerner | |
| 4,823,265 A | 4/1989 | Nelson | |
| 4,933,842 A | 6/1990 | Durbin et al. | |
| 4,980,542 A | 12/1990 | Jackson et al. | |
| 5,056,019 A | 10/1991 | Schultz et al. | |
| 5,193,055 A | 3/1993 | Brown et al. | |
| 5,325,418 A | 6/1994 | McGregor et al. | |
| 5,864,685 A | 1/1999 | Hagan | |
| 5,875,435 A | 2/1999 | Brown | |
| 5,918,218 A | 6/1999 | Harris et al. | |
| 6,154,731 A | 11/2000 | Monks et al. | |
| 6,415,267 B1 | 7/2002 | Hagan | |
| 6,687,681 B1 | 2/2004 | Schulz et al. | |
| 7,831,497 B2 | 11/2010 | O'Neill | |
| 7,860,770 B2 | 12/2010 | Ciampi et al. | |
| 8,126,837 B2 | 2/2012 | Stollman | |
| 2002/0111891 A1 | 8/2002 | Hoffman et al. | |
| 2003/0172021 A1 | 9/2003 | Huang | |
| 2004/0117284 A1 | 6/2004 | Speth | |
| 2005/0131793 A1* | 6/2005 | Hill | 705/36 |
| 2007/0112659 A1* | 5/2007 | Shalen et al. | 705/35 |
| 2007/0162373 A1 | 7/2007 | Kongtcheu | |
| 2007/0271196 A1 | 11/2007 | Blitzer et al. | |
| 2009/0138411 A1 | 5/2009 | O'Callahan | |
| 2010/0017343 A1 | 1/2010 | Willis et al. | |
| 2010/0063941 A1 | 3/2010 | Weiss | |
| 2010/0116880 A1 | 5/2010 | Stollman | |
| 2010/0122315 A1 | 5/2010 | Stollman | |
| 2010/0125535 A1 | 5/2010 | Nowak et al. | |
| 2010/0228575 A1 | 9/2010 | Yolles | |

* cited by examiner

*Primary Examiner* — Olabode Akintola
(74) *Attorney, Agent, or Firm* — Cooley LLP

(57) ABSTRACT

In one embodiment, a first device is configured to determine a value of an asset at a second time. The value of the asset can be based at least in part on a quantity of the asset and a value of a multiplier fund. The value of the multiplier fund can be based at least in part on an adjustment value. The adjustment value can be based at least in part on a value of an index at a first time, the value of the index at the second time and a multiplier value associated with the multiplier fund. The first device can be configured to send, to a second device and in substantially real-time, a signal including at least one of: the value of the asset at the second time, the value of the multiplier fund and the adjustment value.

20 Claims, 6 Drawing Sheets

| Trading Day | Index Value | Φ | Multiplier Fund Share Value |
|---|---|---|---|
| 1 | 103 | 1.0291 | 106 |
| 2 | 105 | 1.0476 | 110 |
| 3 | 103 | 1.0291 | 106 |
| 4 | 107 | 1.0654 | 114 |
| 5 | 110 | 1.0909 | 120 |
| 6 | 106 | 1.0566 | 112 |
| 7 | 107 | 1.0654 | 114 |
| 8 | 105 | 1.0476 | 110 |

FIG. 7

METHODS AND APPARATUS RELATED TO BILLING AND ACCOUNTING FOR ASSETS THAT REQUIRE MORE THAN TWO FACTORS TO ESTABLISH ASSET VALUE

BACKGROUND

Some embodiments described herein relate generally to outputting asset values, and more particularly to methods and apparatus for determining and outputting price and transaction values for an index multiplier fund.

Many known accounting systems are limited to a single model for establishing the value (V) of an asset: price times quantity (P*Q). While this model is broadly applicable and effective, it fails to account for additional complexity inherent in many real-world asset valuation methods. For example, the value of produce is a function not only of price times quantity, but also of time. Because fruit is often picked before it is ripe, its price may increase over time as it ripens. Thus, the value of a given amount of fruit is better expressed using a modified P*Q model, where P=F(t), and t is the variable time. In this example, the pricing value function F(t) starts low, rises over time to peak ripeness, then declines to zero as the value of the produce declines to a complete write-off as spoilage occurs. Thus, a more-accurate valuation model for fruit can be expressed as V=F(t) Q, where F(t) is the unit price of the fruit at a given time t (with the quantity of fruit, Q, being constant throughout the maturation process).

In addition, the value of some assets can change as a function of value-add that takes place during the production, manufacturing and/or distribution processes. These processes can also alter the quantity of the asset. For example, the value of the inventory of a lumber mill may increase, and the quantity decrease, as lumber is transformed from board feet to finished roof trusses or moldings. Thus, in an appropriate modified P*Q model, price (P)=F(stage) and quantity (Q)=$F_2$ (stage), where stage represents a step function related to the stage in the transformation of the lumber into the finished product. Typically, in this processing, P increases from stage to stage, while Q decreases or has its metric completely transformed (e.g., from board feet to linear feet for a molding). Using this modified method of determining P and Q, a modified valuation model for lumber can be expressed V=F (stage)*$F_2$(stage).

In investing, the growth of index funds (such as Exchange Traded Funds, or "ETFs") has been followed by an expansion in aggressive, leveraged funds based on an underlying index fund. The daily change in price of these "multiplier funds" is a multiple of the daily percentage change of the underlying index on which the multiplier fund is based. While on an intra-day and daily basis these multiplier funds closely mirror the performance of the underlying index, the nature of the P*Q pricing mechanism causes such funds to lose fidelity with the underlying index over time. This loss of fidelity is caused by the natural changes in direction (e.g., from rising to falling or vice-versa) in the daily closing value of the underlying index, which create a divergence between the multiplier fund and the underlying index. This divergence means that an investor may incur a loss in the sale of a multiplier fund even though its underlying index is equal to or higher than the value point at which the multiplier fund was purchased. Over time these daily index fluctuations manifest multiple changes in "direction" (i.e., from gain to loss or loss to gain), which can cause this performance gap to continually grow. While many investors in aggressive multiplier funds are day-traders who remain unaffected by this divergence (since it only arises over time), such funds can impose a significant penalty on positions taken over a longer duration.

Thus, a standard two-variable P*Q value model for a multiplier fund does not provide sufficient degrees of freedom to track the value of produce over time, to track the value of inputs being transformed, or to both accurately track daily percentage changes in an underlying index fund and maintain fidelity therewith. As such, a need exists for methods and apparatus that utilize a multi-variable method to value a multiplier fund, thereby exploiting its inherent aggressiveness without incurring the above-described performance gap. These methods can also be applied to other valuation problems such as produce and milled lumber in order to provide current dynamic inventory, rather than a periodic (e.g., quarterly) estimate or hard count.

SUMMARY

In one embodiment, a first device is configured to determine a value of an asset at a second time. The value of the asset can be based at least in part on a quantity of the asset and a value of a multiplier fund at the second time. The value of the multiplier fund at the second time can be based at least in part on a value of an index at the second time and an adjustment value. The adjustment value can be based at least in part on a value of the index at a first time, the value of the index at the second time and a multiplier value associated with the multiplier fund. The first device can be configured to send, in substantially real-time, a signal including at least one of: the value of the asset at the second time, the value of the multiplier fund at the second time and the adjustment value. A second device can be configured to receive the signal and output at least one of the value of the asset at the second time, the value of the multiplier fund at the second time and the adjustment value.

BRIEF DESCRIPTION OF THE DRAWINGS

FIG. 7 is a table illustrating sample closing values of an underlying index, the corresponding value Φ for a 2× multiplier fund and the share price of the 2× multiplier fund based on the underlying index, according to an embodiment.

DETAILED DESCRIPTION

Figure 1:
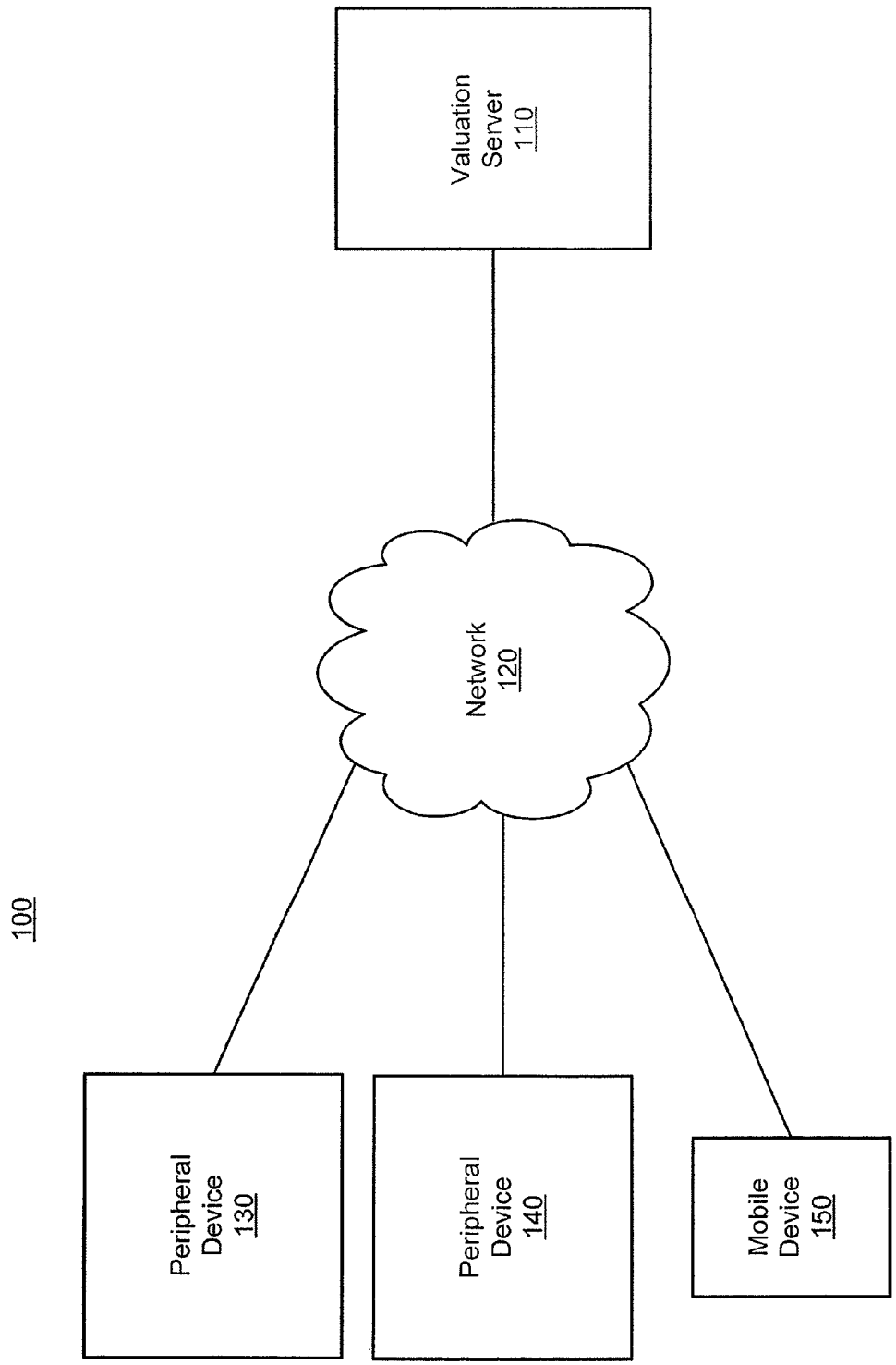
FIG. 1 is a schematic illustration of a multiplier fund valuation system, according to an embodiment.

In some embodiments, a valuation system can include a valuation server operatively coupled to one or more peripheral devices via a network. The valuation server can include, for example, one or more hardware-based and/or software-based modules configured to determine a value of a multiplier fund based on an underlying index and/or the value of a portfolio of one or more assets, the value of at least one of which is based on the multiplier fund. In some embodiments, the valuation server can receive information associated with the underlying index, such as a current, previous, historical and/or predicted future values of the underlying index. The valuation server can also optionally receive an asset value or quantity, such as a quantity of shares of the multiplier fund.

Based at least in part on the received information, the valuation server can determine a current unit price of the multiplier fund. The valuation server can determine the current unit price based on a current price/value of the underlying index and an adjustment value Φ. The adjustment value Φ can be determined based at least in part on a previous price/value of the underlying index, the current price/value of the underlying index and a multiplier value associated with the multiplier fund. Based on the current unit price/value of the multiplier fund, the valuation server can next determine a value of an asset based on the multiplier fund, such as a quantity of shares of the multiplier fund. For example, the valuation server can determine a product of the quantity of shares of the multiplier fund and the current price/value of the multiplier fund to determine an overall value of the quantity of shares.

Having determined the current value of the multiplier fund and/or an asset based thereon, the valuation server can define one or more signals including the determined information. The valuation server can next send the one or more signals to one or more peripheral devices, via a network. The network can be, for example, a local area network (LAN), wide area network (WAN) or the Internet. In some embodiments, the one or more signals can be received by one or more peripheral devices, such as a personal computer, a tablet computing device and/or a mobile computing device, such as a smartphone.

Upon receipt of the one or more signals, any of the peripheral devices can output one or more pieces of information. For example, a mobile peripheral device can output at a display the current price/value of the multiplier fund, along with a current value of a quantity of shares thereof. In another example, a personal computing device can output, via a speaker, one or more audio signals or sounds relaying a current, historical and/or predicted value of the underlying index and/or the multiplier fund. In another example, a tablet computing device can output, at a display of the tablet computing device, a chart and/or graph indicating the price/value of the multiplier fund and/or the underlying index over a predetermined and/or configurable period of time.

FIG. 1 is a schematic illustration of a multiplier fund valuation system 100, according to an embodiment. More specifically, FIG. 1 illustrates a multiplier fund valuation system 100 that includes a valuation server 110 in communication with a peripheral device 130, a peripheral device 140 and a mobile device 150, via a network 120. Although shown as including a single valuation server, a single network, two peripheral devices and a single mobile device, in some embodiments, the multiplier fund valuation system 100 can include multiple valuation servers, multiple networks and any number of peripheral devices and/or mobile devices.

The valuation server 110 can be any combination of hardware and/or software (executing in hardware) configured to determine a current and/or historical values of a multiplier fund based on a current and/or historical values of an underlying index fund. The valuation server 110 can be further configured to determine a current, historical and/or predicted future values of one or more assets based on the multiplier fund, such as a quantity of shares of the multiplier fund. For example, the valuation server 110 can be a computing device, such as a server or personal computing device (e.g., a rack-mounted or other server, a desktop, laptop, notebook, etc.). The valuation server 110 can optionally include one or more hardware and/or software modules configured to receive information associated with a value of an index or other fund and determine a value of one or more multiplier funds based on that index fund. As shown in FIG. 1, the valuation server 110 can be physically and/or operatively coupled to the peripheral device 130, a peripheral device 140 and a mobile device 150, via a network 120. In some embodiments, the valuation server 110 can be coupled to the network 120 via a wireless and/or wired data connection, such as a connection based on one or more of the Institute of Electrical and Electronics Engineers (IEEE) 802.x standards (e.g., IEEE 802.3 Ethernet, 802.11 wireless LAN, 802.16 WiMAX). Alternatively, in some embodiments, the valuation server 110 can be coupled to the network 120 via hardware and/or software based on one or more short-range connection standards, such as Bluetooth, wireless Universal Serial Bus (USB), Ultra-wideband (UWB), Radio-frequency identification (RFID), etc. In some embodiments, the valuation server 110 can be operatively and/or physically coupled to one or more other networks or devices (not shown in FIG. 1), from which it can be configured to receive information associated with the current and/or historical value of an underlying index, brokerage account information, and the like.

The network 120 can be any computer network configured to receive and send information between each or any of the peripheral device 130, the peripheral device 140, the mobile device 150 and the valuation server 110. The network 120 can include one or more computer devices, such as switching, routing, storage and/or other devices. In some embodiments, the network 120 can be a local area network (LAN), wide area network (WAN), organization intranet, or the Internet.

The peripheral devices 130 and 140 can each be any network-enabled computing device capable of exchanging and outputting information in textual, audio and/or graphical form (or storing the data for later output to such a peripheral device). For example, either or both of the peripheral devices 130 and 140 can be a client computing device, such as a personal computer, tablet computing device, or other desktop or mobile computing device. As shown in FIG. 1, each of the peripheral device 130 and the peripheral device 140 is operatively coupled to the network 120, and in communication with the valuation server 110 via the network 120. More specifically, each of the peripheral device 130 and the peripheral device 140 can be operatively coupled to the network 120 via one or more wireless and/or wired connections and/or protocols. For example, in some embodiments, the peripheral device 130 can be operatively coupled to the network 120 via a wireless network module (e.g., a wireless Ethernet network interface card ("NIC")) and/or a wired network module (e.g., a wired Ethernet NIC and/or a Fibre Channel host bus adapter ("HBA") or converged network adapter ("CNA"). In some embodiments, the peripheral device 130 and/or the peripheral device 140 can be operatively coupled to the network 120 via a modem, such as a modem configured to exchange information via a standard telephone line. In some embodiments, either or both of the peripheral devices 130 and 140 can be physically and/or operatively coupled to one or more output devices, such as a speaker, monitor, projector, television, printer, tactile feedback device, or other display and/or output device.

The mobile device 150 can be any mobile computing device capable of exchanging information with the valuation server 110 via the network 120. For example, the mobile device 150 can be a cellular telephone (e.g., a smartphone), a personal digital assistant (PDA), a tablet computing device, or other portable computing and/or communications device. The mobile device 150 can be operatively coupled to the network 120 via, for example a cellular- and/or Internet Protocol (IP)-based network, such as an Enhanced Data Rates for GSM Evolution (EDGE), Global System for Mobile (GSM), Code division multiple access (CDMA), Time division multiple access (TDMA), Long Term Evolution (LTE), or other network. In some embodiments, the mobile device 150 can include one or more hardware and/or software modules (executing in hardware) configured to exchange information via the network 120 on behalf of the mobile device 150. The mobile device 150 can also optionally include and/or be coupled to one or more output devices and/or modules, such as a display screen, speaker, tactile feedback device or other output device.

Figure 2:
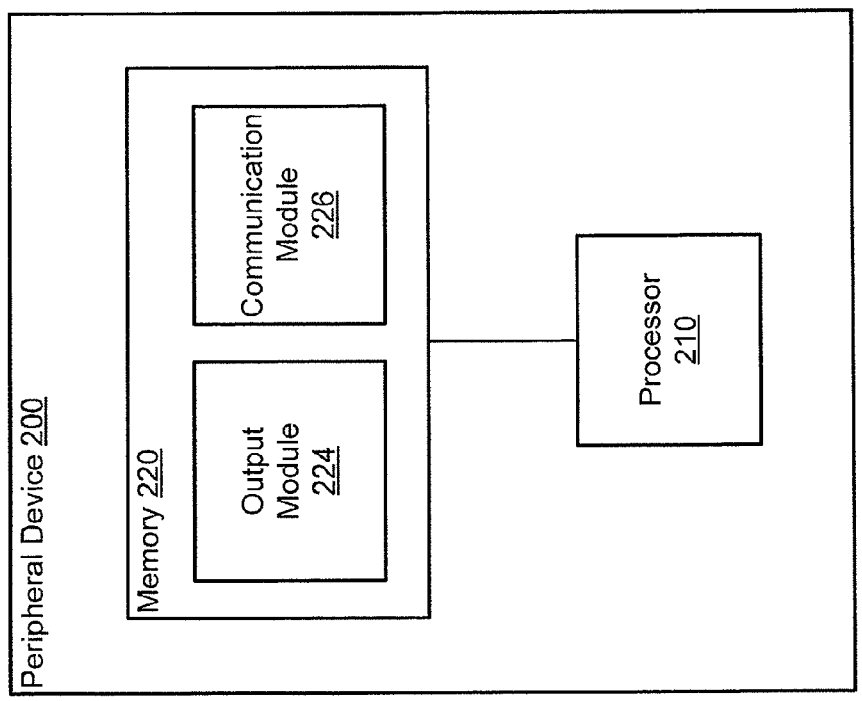
FIG. 2 is a system block diagram of a peripheral device of a multiplier fund valuation system, according to an embodiment.

FIG. 2 is a system block diagram of a peripheral device of a multiplier fund valuation system, according to an embodiment. More specifically, FIG. 2 is a system block diagram of a peripheral device 200, similar to the peripheral device 130 described in connection with FIG. 1 above. The peripheral device 200 includes a processor 210 and a memory 220. The memory 220 includes an output module 224 and a communication module 226. The processor 210 is operatively coupled to the memory 220.

The processor 210 can be a general-purpose processor (e.g., a central processing unit (CPU)) or other processor configured to execute one or more instructions. In some embodiments, the processor 210 can alternatively be an application-specific integrated circuit (ASIC) or a field programmable gate array (FPGA). The memory 220 can be any fixed or removable memory, such as a Random Access Memory (RAM), Read Only Memory (ROM), a hard disk drive, a solid-state drive (SSD), an optical drive, a flash memory drive, other removable media.

The output module 224 can be a hardware-based and/or software-based module (executing in hardware) configured to output data. For example, the output module 224 can be a hardware module (e.g., a graphics card) operatively coupled to a software module (e.g., a video driver). In the example, the output module 224 can be operatively and/or physically coupled to a visual display device, such as a monitor, television, projector, printer, or other display screen or device. Alternatively, the output module 224 can be a hardware and/or software module configured to output an audio or tactile output representing data and/or media. In some embodiments, the output module 224 can be configured to output any combination of audio, video, graphical, or tactile feedback and/or output. More specifically, the output module 224 can be configured to output information associated with a current, historical and/or predicted future value or values of a multiplier fund and/or an index fund on which the multiplier fund is based. In some embodiments, the output module 224 can do so in response to one or more messages, data frames, data packets and/or other information received from another device, such as a valuation server (such as the valuation server 110 of FIG. 1). In some embodiments, the output module 224 can be configured to output information associated with current, historical and/or predicted future value or values of one or more assets based on the multiplier fund, such as a quantity of shares of the multiplier fund or other asset. In some embodiments, the output module 224 can be configured to display any of the above-described information as a chart, graph, animation, or other graphical figure or resource.

The communication module 226 can be a hardware-based and/or software-based module (executing in hardware) configured to exchange information with one or more other devices or modules. More specifically, the communication module 226 can include one or more network communication cards, drivers and/or other hardware and/or software modules configured to send information to and/or receive information from a network and/or one or more server or client devices. Thus, in some embodiments, the communication module 226 can send, to a valuation server (via a network, e.g. the network 120 of FIG. 1) one or more requests for information associated with a multiplier fund, a related index fund and/or an asset based on the multiplier fund. In such embodiments, the communication module 226 can also receive the requested information and/or send the same for output by the output module 224.

Figure 3:
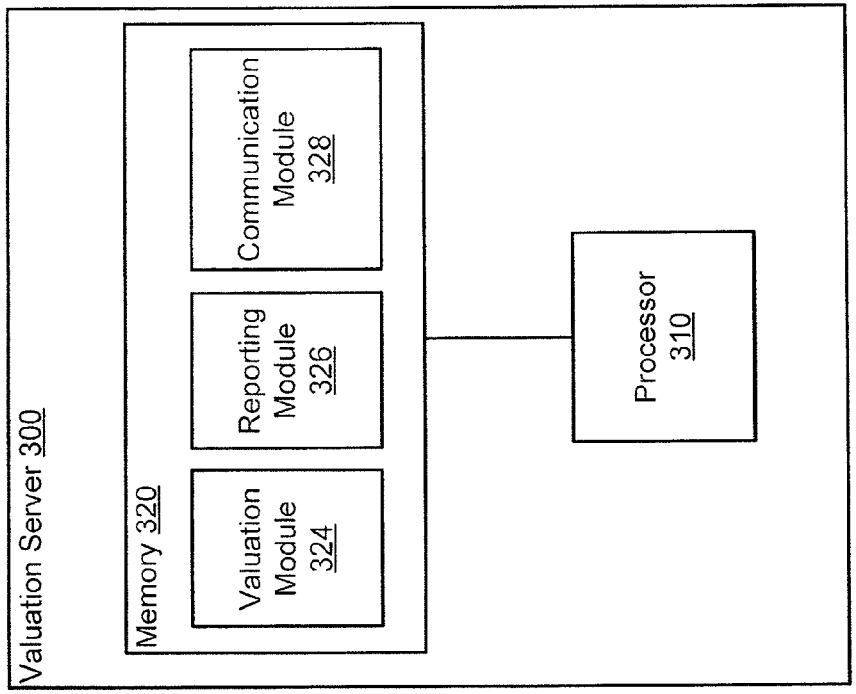
FIG. 3 is a system block diagram of a valuation server of a multiplier fund valuation system, according to an embodiment.

FIG. 3 is a system block diagram of a valuation server of a multiplier fund valuation system, according to an embodiment. More specifically, FIG. 3 is a system block diagram of a valuation server 300, similar to the valuation server 110 described in connection with FIG. 1 above. The valuation server 300 includes a processor 310 and a memory 320. The memory 320 includes a valuation module 324, a reporting module 326 and a communication module 328. The processor 310 is operatively coupled to the memory 320.

The processor 310 can be a general-purpose processor or other processor configured to execute one or more instructions. In some embodiments, the processor 310 can alternatively be an application-specific integrated circuit (ASIC) or a field programmable gate array (FPGA). The memory 320 can be any fixed or removable memory, such as a Random Access Memory (RAM), Read Only Memory (ROM), a hard disk drive, a solid-state drive (SSD), an optical drive, a flash memory drive, other removable media.

The valuation module 324 can be any hardware-based module and/or software-based module configured to determine a value (such as a current, historical, or predicted future value or values) for one or more multiplier funds based on one or more index funds. The valuation module 324 can also be configured to determine a value (such as a current, historical, or predicted future value or values) for one or more assets based on the multiplier funds, such as a quantity of shares of the multiplier fund. In some embodiments, the valuation module 324 can be a circuit board including an ASIC and/or FPGA operatively configured to calculate the multiplier fund and/or asset value(s) described above. Alternatively, the valuation module 324 can include one or more software modules configured to receive information from the communication module 328, such as current and/or historical values for an index fund. Based on the received index fund value(s), the valuation module 324 can determine appropriate and corresponding values of a multiplier fund based thereon and/or one or more assets based on the multiplier fund.

More specifically, the valuation module 324 can determine a value of a multiplier fund based at least in part on (1) a current value of the underlying index; (2) a previous value of the underlying index; (3) a multiplier of the multiplier fund (e.g., 2×, 3×, −2×, −1×, etc.); (4) and an adjustment value (referred to hereinafter as $\Phi$). To determine the value of $\Phi$, the valuation module 324 can perform the following operation:

$\Phi = [PV_{Index} * (1+(((CV_{Index} - PV_{Index}) * M)/100))]/CV_{index}$, where $PV_{Index}$ represents the previous closing value of the underlying index, $CV_{index}$ represents the current value of the underlying index, M represents the multiplier for the multiplier fund and $\Phi$ represents the adjustment value. For example, if the previous closing value of the underlying index (and of the multiplier fund) is 100, the current value of the underlying index is 103 and the multiplier for the multiplier fund is 2, then $\Phi=[100*(1+(((103-100)*2)/100))]/103$, which equals 1.0291.

The valuation module 324 can next determine a single share price/value for the multiplier fund by multiplying the current value of the underlying index by $\Phi$ (expressed $V_{Fund}=CV_{index}*\Phi$). In the example above, the share price $V_{Fund}$ of the multiplier fund is thus 103*1.0291, which equals 106. Thus, inasmuch as the current share price ($V_{Fund}$) of the multiplier fund is 106, the previous share price of both the multiplier fund and the underlying index ($PV_{Index}$) is 100 and the current value of the index ($CV_{Index}$) is 103, the share price of the multiplier fund manifests exactly a two times (2×) change (i.e., a 6% change) compared to that of the underlying index (i.e., a 3% change). In this manner, the share price of the multiplier fund is split across two components (i.e., $CV_{index}$ and $\Phi$), both of which can be tracked and reported along with the resulting multiplier fund share price. Having determined the share price (i.e., value) for the multiplier fund, the valuation module 324 can define and send, to the reporting module 326, one or more signals including the share price.

The reporting module 326 can be any hardware-based module and/or software-based module configured to send information associated with an index fund and/or an associated multiplier fund (based thereon). For example, the reporting module 326 can be a set of one or more software modules configured to receive information from the valuation module 324 and format the same for transmission to one or more requesting peripheral devices. Although not shown in FIG. 3, in some embodiments the valuation module 324 can request and receive historical and/or other value information for the underlying index and/or the multiplier fund from an external memory, such as a database. Based on the received information, the reporting module 326 can optionally define reporting information based on the underlying index and/or the multiplier fund. For example, the reporting module 326 can define one or more trend-based metrics, price predictions and/or charts, graphs, tables or other graphical representations configured to convey information associated with the underlying index and/or the multiplier fund. In some embodiments, the reporting module 326 can be configured to send the reporting information to the communication module 328 for transmission to the one or more requesting peripheral devices.

The communication module 328 can be a hardware-based and/or software-based module (executing in hardware) configured to exchange information with one or more other devices or modules. More specifically, the communication module 328 can include one or more network communication cards, drivers and/or other hardware and/or software modules configured to send information to and/or receive information from a network and/or one or more server or client devices. Thus, in some embodiments, the communication module 328 can send, to one or more peripheral devices (via a network, e.g. the network 120 of FIG. 1) one or more signals including information defined by the valuation module 324 and/or the reporting module 326.

Figure 4:
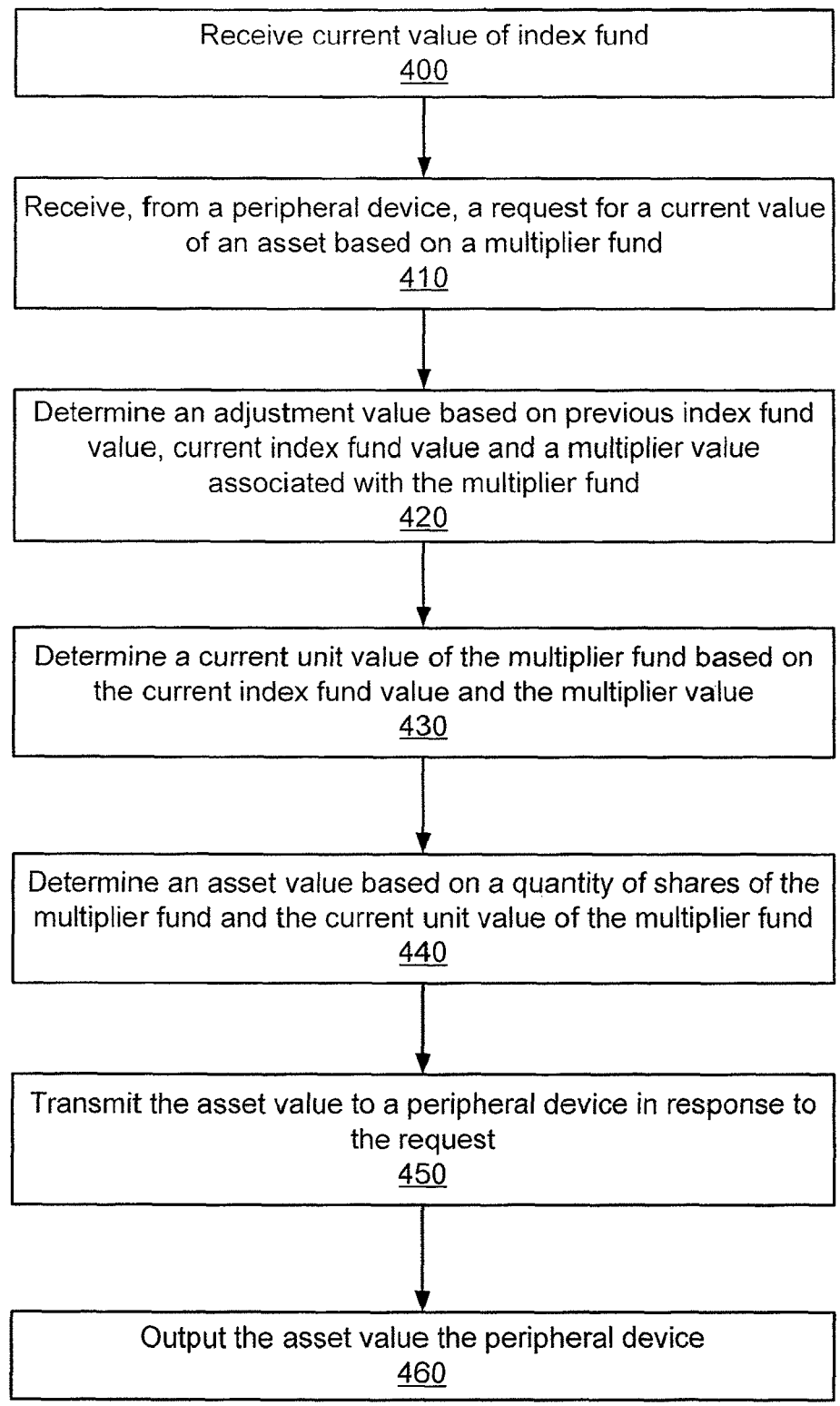
FIG. 4 is a flow chart illustrating a method of determining and outputting a current value of a number of shares of a multiplier fund based on an adjustment value, according to an embodiment.

FIG. 4 is a flow chart illustrating a method of determining and outputting a current value of a number of shares of a multiplier fund based on an adjustment value, according to an embodiment. More specifically, a valuation server can receive a current value of an index, 400. The valuation server can be, for example, a hardware device configured to determine a current value of one of more multiplier funds based on their respective underlying index funds. In some embodiments, the valuation server can be operatively coupled to one or more peripheral devices (e.g., client computing devices) via a network, such as a LAN, a WAN and/or the Internet. In some embodiments, the valuation server can receive the current value of the index from another device, such as a server device. The server device can optionally be operatively and/or physically coupled to the valuation server via a network, such as a LAN, a WAN and/or the Internet.

The valuation server can receive, from a peripheral device, a request for a current value of an asset based on a multiplier fund, 410. In some embodiments, the multiplier fund can be based on the index, and the asset can be, for example, a number of shares of the multiplier fund. The valuation server can receive the request via a network, such as a LAN, a WAN or the Internet. In some embodiments, the request can be received from a client hardware and/or software module, such as a web browser. In such embodiments, the request can be formatted according to the Hypertext Transfer Protocol (HTTP) or other known protocol.

The valuation server can next determine an adjustment value based on a previous value of the index, the current value of the index and a multiplier value associated with the multiplier fund, 420. More specifically, in response to the received request, the valuation server can determine an adjustment value $\Phi$ based at least in part on the following equation: $\Phi=[PV_{Index}*(1+(((CV_{Index}-PV_{Index})*M)/100))]/CV_{Index}$, where $PV_{Index}$ represents the previous closing value of the index, $CV_{Index}$ represents the current value of the index, M represents the multiplier for the multiplier fund and $\Phi$ represents the adjustment value.

The valuation server can next determine a current unit value of the multiplier fund based on the current value of the index and the multiplier value, 430. Said differently, having determined the adjustment value $\Phi$ for the multiplier fund, the valuation server can determine a current unit value of the multiplier fund based on the following equation: $V_{Fund}=CV_{Index}*\Phi$, where $CV_{Index}$ is the current value of the index, $\Phi$ is the adjustment value and $V_{Fund}$ is the current unit value of the multiplier fund.

Based on the current unit value of the multiplier fund, the valuation server can determine an asset value based on a quantity of shares of the multiplier fund and the current unit value, 440. More specifically, the valuation server can multiply the current unit value of the multiplier fund by the quantity of shares to determine a total value of the quantity of shares of the multiplier fund. In some embodiments, the quantity of shares of the multiplier fund can be a quantity of shares currently held by an individual (e.g., an individual currently operating the requesting peripheral device).

Having determined the current asset value of the shares of the multiplier fund, the valuation server can define and send a signal including the current asset value to the requesting peripheral device, 450. The signal can also optionally include the current unit value of the multiplier fund, the quantity of shares of the multiplier fund, the current and previous values of the index, etc. In some embodiments, the valuation server can send the signal to the requesting peripheral device via the network described in connection with step 410 above. In some embodiments, the valuation server can send the signal via a wired and/or wireless network connection, such as an Ethernet, wireless Ethernet, cellular network, Fibre Channel or other network connection. In some embodiments, the valuation server can send the signal on a periodic basis, such as hourly, daily, etc.

Upon receipt of the current asset value for the shares of the multiplier fund, the requesting peripheral device can output the current asset value, 460. For example, the requesting peripheral device can output the current asset value at a visual display (e.g., a monitor, a projector, etc.), via a speaker and/or via a tactile feedback device or mechanism. In some embodiments, the requesting peripheral device can output the value within a visual window, such as an operating system window associated with a currently-executing web browser application. If the received signal includes additional information (such as the current unit price of the multiplier fund, the quantity of shares of the multiplier fund, etc.), the requesting peripheral device can output any or all of this additional information.

Figure 5:
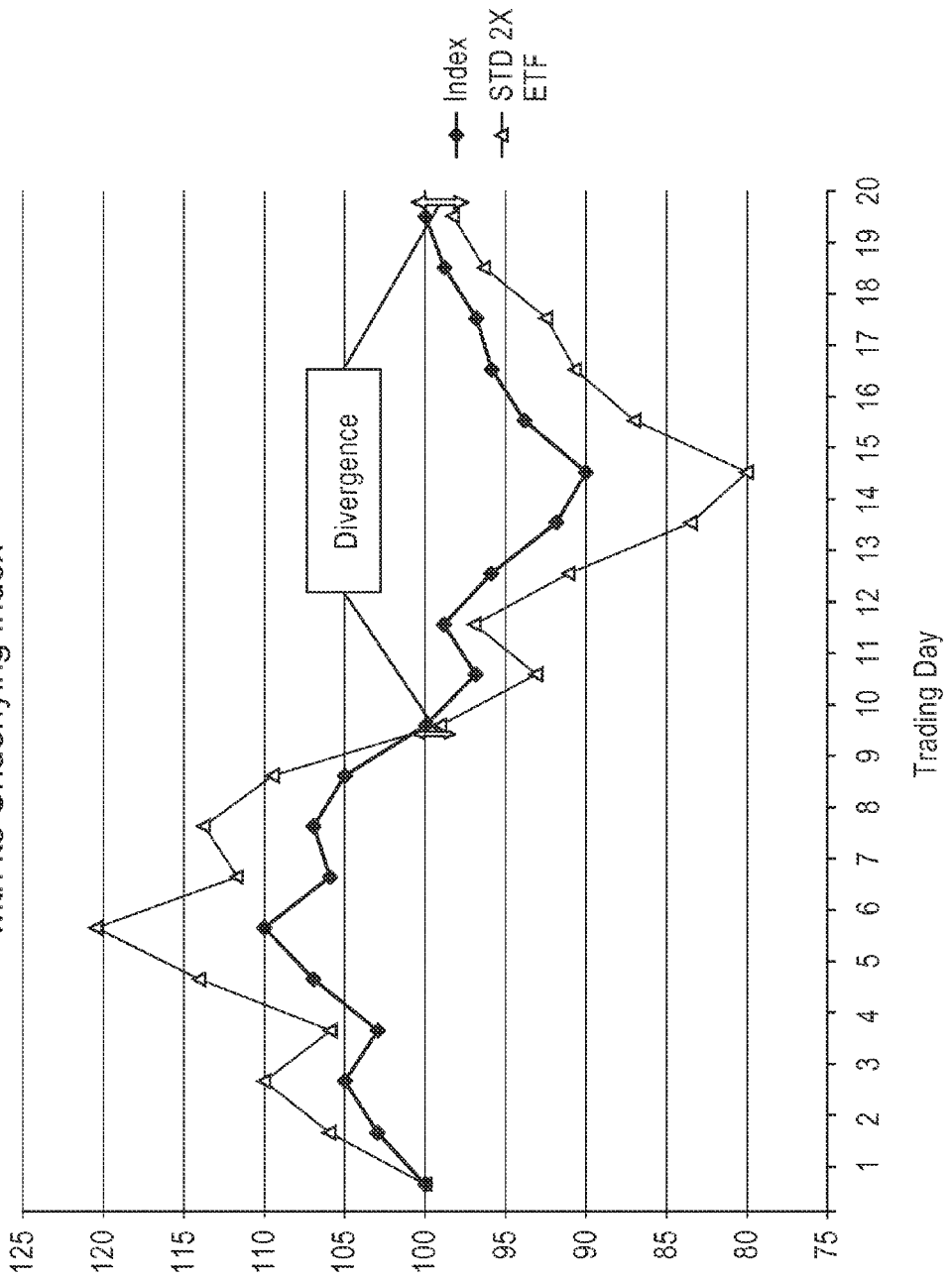
FIG. 5 is a time-series value chart illustrating the relationship of a 2× multiplier fund to its associated underlying index over a twenty trading day period, with the price of the 2× multiplier fund being calculated without an adjustment value.

FIG. 5 is a time-series value chart illustrating the relationship of a 2× multiplier fund to its associated underlying index over a twenty trading day period, with the price of the 2× multiplier fund being calculated without an adjustment value. More specifically, FIG. 5 shows, for the twenty trading day period, both the prices of an example index and of an example multiplier fund whose daily percentage change is double the daily percentage change of the underlying example index. For example, if an investor purchases an ETF based on the underlying index on day 1, the investor pays 100 for the ETF (per the current underlying index price of 100). Ten days later, after the price of the underlying index has risen and subsequently dropped back to the original purchase price of 100, rather than also returning to its original purchase price of 100, the price of the multiplier fund is 99.19—nearly 1% less than its original purchase price. On day 20, after the price of the underlying index has further declined and subsequently risen and returned to the original purchase price, the price of the multiplier fund is at 98.44—reflecting a paper loss of 1.5%, even though there has been no net change in the underlying index price. Said differently, even though the underlying index price is unchanged, if an investor were to sell at this point, he/she would realize a loss. This divergence continues to increase as long as the underlying index does not make a sustained and dramatic move in any one direction. Only when the underlying index begins a steady and dramatic move upwards would an investor overcome this negative divergence and exploit the benefits of the aggressive 2× multiplier fund.

Figure 6:
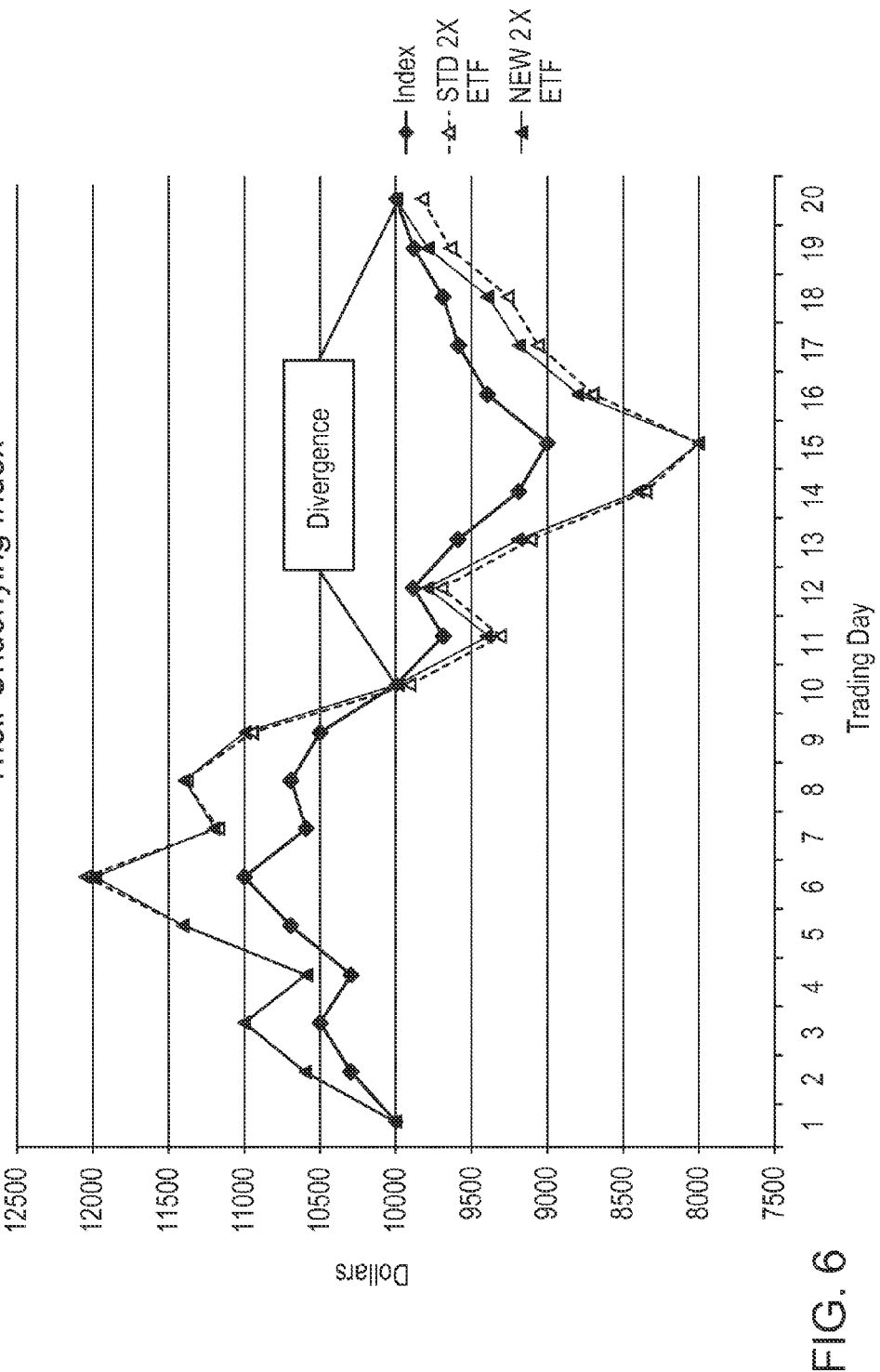
FIG. 6 is a time-series value chart illustrating the relationship between an index, a first, traditional 2× multiplier fund based on the index and a second 2× multiplier fund based on the index, the price of which is calculated using an adjustment value, according to an embodiment.

FIG. 6 is a time-series value chart illustrating the relationship between an index, a first, traditional 2× multiplier fund based on the index and a second 2× multiplier fund based on the index, the price of which is calculated using an adjustment value, according to an embodiment. More specifically, FIG. 6 shows, for a twenty trading day period, the prices of an index, a traditional 2× multiplier fund based on the index and a 2× multiplier fund also based on the index, the price of which is calculated using an additional adjustment value variable. As shown in FIG. 6, at days 10 and 20 of the trading period, a divergence exists between the prices of the underlying index and the first (traditional) 2× multiplier fund. As also shown in FIG. 6, no such divergence exists between the prices of the underlying index and the second 2× multiplier fund at the time period. As discussed in connection with FIG. 3 above, this lack of divergence between the prices of the underlying index and the second 2× multiplier fund is due to a determination of the second 2× multiplier fund price using an adjustment variable Φ.

FIG. 7 is a table illustrating sample closing values of an underlying index, the corresponding value Φ for a 2× multiplier fund and the share price of the 2× multiplier fund based on the underlying index, according to an embodiment. More specifically, FIG. 7 displays a listing of an example time series demonstrating how the underlying index value, the value Φ and the share price of the 2× multiplier fund correlate over the course of eight trading days. As can be seen in FIG. 7, each daily change in the share value of the 2× multiplier fund is exactly twice that of the underlying index fund on which it is based.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments, the valuation server can be physically and/or operatively coupled to one or more other valuation servers of a valuation system.

What is claimed is:

1. A system, comprising:
a first device configured to determine, in substantially real-time, a value of an asset at a second time, the value of the asset at the second time being based at least in part on:
a quantity of the asset, and
a value of a multiplier fund at the second time, the value of the multiplier fund at the second time being based at least in part on:
a value of an index at the second time, and
an adjustment value, the adjustment value being based at least in part on:
a value of the index at a first time,
the value of the index at the second time, and
a multiplier value associated with the multiplier fund,
the first device configured to send, in substantially real-time, a signal including at least one of:

the value of the asset at the second time,
the value of the multiplier fund at the second time, and
the adjustment value; and
a second device configured to receive the signal and output at least one of:
the value of the asset at the second time,
the value of the multiplier fund at the second time, and
the adjustment value.

2. The system of claim 1, wherein the first device determines the value of the asset at the second time based at least in part on a difference between the value of the index at the first time and the value of the index at the second time.

3. The system of claim 1, wherein the index is one of:
a securities index; or
a commodities index.

4. The system of claim 1, wherein the second device is configured to determine a value of an account at the second time based at least in part on the value of the asset at the second time.

5. The system of claim 1, wherein the second device is configured to output, at a display, a visual representation of one or more changes in the value of the asset over time.

6. The system of claim 1, wherein the asset includes one or more shares of the multiplier fund.

7. The system of claim 1, wherein the first device is configured to calculate the value of the multiplier fund at the second time based on a mathematical product of the value of the index at the second time, and the adjustment value.

8. The system of claim 1, wherein the value of the index at the second time is based at least in part on a value of an exchange traded fund (ETF) at the second time.

9. A system, comprising:
a plurality of devices operatively coupled over a network, the plurality of devices configured to determine a value of an asset,
a first device from the plurality of devices configured to perform a first portion of the determining, the first device configured to send a signal based at least in part on the first portion of the determining,
a second device from the plurality of devices configured to receive the signal,
the second device configured to perform a second portion of the determining based at least in part on the signal,
the determining being based at least in part on: (1) a quantity of the asset; (2) an index value change amount; (3) an index value at a first time; (4) an index value at a second time; (5) a multiplier value; and (6) an adjustment value AV.

10. The system of claim 9, wherein the plurality of devices is included in a distributed computing environment.

11. The system of claim 9, wherein the adjustment value AV is calculated based on the equation:

$$AV=[\text{index value at the first time}*((1+(\text{index change amount}*\text{multiplier value}))/100)]/\text{index value at the second time}.$$

12. The system of claim 11, wherein the value of the asset equals the adjustment value AV multiplied by the quantity of the asset.

13. The system of claim 9, wherein the multiplier value is a multiplier value associated with a multiplier fund.

14. The system of claim 9, wherein the plurality of devices determines the value of the asset in substantially real-time.

15. The system of claim 9, wherein at least one device from the plurality of devices is a mobile device.

16. A non-transitory processor-readable medium storing code representing instructions configured to cause a processor to:
receive a value of an index at a first time; receive a value of the index at a second time; and
determine a value of a multiplier fund based at least in part on: (1) the value of the index at the first time, (2) the value of the index at the second time, and (3) a predefined multiplier value associated with the multiplier fund; and
output the value of the multiplier fund at a display.

17. The non-transitory processor-readable medium of claim 16, wherein the value of the index at the first time is received from a device over a network.

18. The non-transitory processor-readable medium of claim 16, wherein the determining includes determining a percentage change value based at least in part on a difference between the value of the index at the first time and the value of the index at the second time.

19. The non-transitory processor-readable medium of claim 16, wherein the code further represents instructions configured to cause the processor to determine a transaction amount based at least in part on the value of the multiplier fund.

20. The non-transitory processor-readable medium of 16, wherein the code further represents instructions configured to cause the processor to perform a capital gain calculation based at least in part on the value of the multiplier fund.

* * * * *